(12) United States Patent
Harada et al.

(10) Patent No.: US 11,115,945 B2
(45) Date of Patent: Sep. 7, 2021

(54) USER TERMINAL AND RADIO COMMUNICATION METHOD

(71) Applicant: NTT DOCOMO, INC., Tokyo (JP)

(72) Inventors: Hiroki Harada, Tokyo (JP); Kazuaki Takeda, Tokyo (JP); Daiki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 49 days.

(21) Appl. No.: 16/608,666

(22) PCT Filed: Apr. 28, 2017

(86) PCT No.: PCT/JP2017/017022
§ 371 (c)(1),
(2) Date: Oct. 25, 2019

(87) PCT Pub. No.: WO2018/198341
PCT Pub. Date: Nov. 1, 2018

(65) Prior Publication Data
US 2020/0145939 A1 May 7, 2020

(51) Int. Cl.
*H04W 56/00* (2009.01)
*H04L 5/00* (2006.01)
(Continued)

(52) U.S. Cl.
CPC ......... *H04W 56/001* (2013.01); *H04L 5/0051* (2013.01); *H04W 72/005* (2013.01); *H04W 72/0453* (2013.01)

(58) Field of Classification Search
CPC ............... H04W 72/005; H04W 72/04; H04W 72/0453; H04W 72/02; H04W 56/001; H04L 5/0051
See application file for complete search history.

(56) References Cited

U.S. PATENT DOCUMENTS

2008/0019309 A1 1/2008 Kwun et al.
2015/0201402 A1* 7/2015 Morioka ............ H04W 72/0446
370/329
(Continued)

FOREIGN PATENT DOCUMENTS

EP 3602921 A2 2/2020
WO 2015163481 A1 10/2015
(Continued)

OTHER PUBLICATIONS

3GPP TSG-RAN WG1 #87; R1-1612289 "Efficient design of SS block" ASTRI, TCL Communication Ltd.; Reno, US; Nov. 14-18, 2016 (7 pages).
(Continued)

*Primary Examiner* — Brian D Nguyen
(74) *Attorney, Agent, or Firm* — Osha Bergman Watanabe & Burton LLP

(57) ABSTRACT

To transmit and receive signals in a radio communication system where communication is carried out based on different configurations from those of existing LTE systems, in accordance with one aspect of the present invention, a user terminal has a receiving section that receives a synchronization signal arranged in a first frequency domain and a broadcast channel arranged in a second frequency domain, which is wider than the first frequency domain, and a control section that controls a receiving process of DL signals, and the control section controls the receiving process on the assumption that, in at least part of given frequency domain that neighbors the first frequency domain, no DL signal is mapped or a specific DL signal is mapped.

16 Claims, 16 Drawing Sheets

(51) Int. Cl.
*H04W 72/00* (2009.01)
*H04W 72/04* (2009.01)

(56) References Cited

U.S. PATENT DOCUMENTS

| | | | |
|---|---|---|---|
| 2016/0330011 A1* | 11/2016 | Lee | H04L 5/006 |
| 2017/0006578 A1* | 1/2017 | Rico Alvarino | H04L 1/0038 |
| 2017/0006596 A1 | 1/2017 | Adachi et al. | |
| 2020/0127879 A1* | 4/2020 | Yokomakura | H04W 48/12 |
| 2020/0195358 A1* | 6/2020 | Yokomakura | H04W 36/0094 |
| 2020/0195401 A1* | 6/2020 | Wu | H04L 25/0202 |
| 2020/0196260 A1* | 6/2020 | Li | H04L 5/0048 |
| 2020/0214003 A1* | 7/2020 | Webb | H04W 72/042 |
| 2020/0305098 A1* | 9/2020 | Kim | H04W 72/0446 |
| 2020/0336236 A1* | 10/2020 | Zhou | H04J 11/0076 |
| 2020/0367173 A1* | 11/2020 | Ryu | H04W 52/14 |

FOREIGN PATENT DOCUMENTS

| | | | |
|---|---|---|---|
| WO | 2017/004087 A1 | 1/2017 | |
| WO | 2018/175206 A2 | 9/2018 | |
| WO | 2018/175206 A3 | 11/2018 | |

OTHER PUBLICATIONS

3GPP TSG RAN WG1 Meeting #88bis; R1-1704361 "NR-PBCH Design" ZTE, ZTE Microelectronics; Spokane, US; Apr. 3-7, 2017 (9 pages).
Supplemental Search Report issued in European Application No. 17907830.8, dated Oct. 27, 2020 (15 pages).
3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010 (149 pages).
International Search Report issued in PCT/JP2017/017022 dated Jul. 25, 2017 (1 page).
Written Opinion of the International Searching Authority issued in PCT/JP2017/017022 dated Jul. 25, 2017 (3 pages).
ITL; "On NR PBCH Design"; 3GPP TSG RAN WG1 Meeting #88bis, R1-1705793; Spokane, USA; Apr. 3-7, 2017 (9 pages).
Extended European Search Report issued in counterpart European Patent Application No. 17907830.8, dated Feb. 24, 2021 (15 pages).
3GPP TSG RAN WG1 Meeting #87; R1-1613046 "On multiplexing between PSS and SSS" Intel Corporation; Reno, USA; Nov. 14-18, 2016 (5 pages).
Office Action issued in Japanese Application No. 2019-515042; dated Jun. 15, 2021 (6 pages).

* cited by examiner

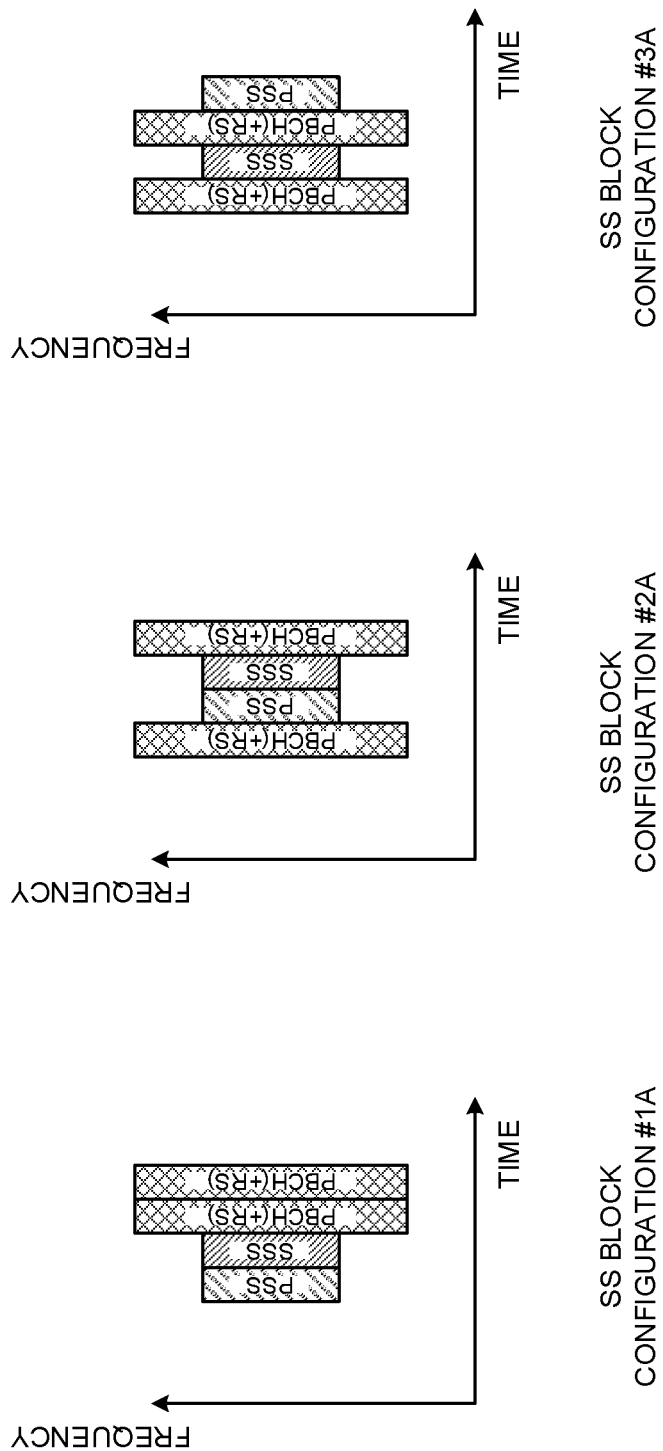

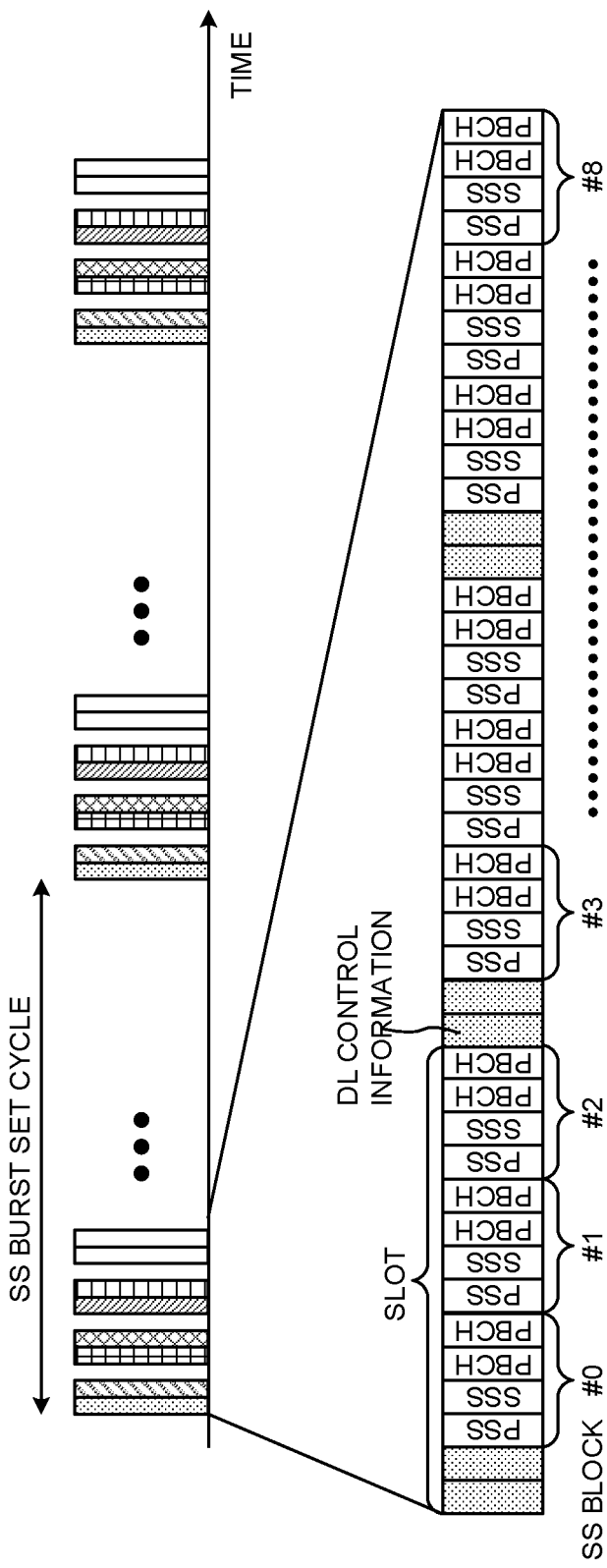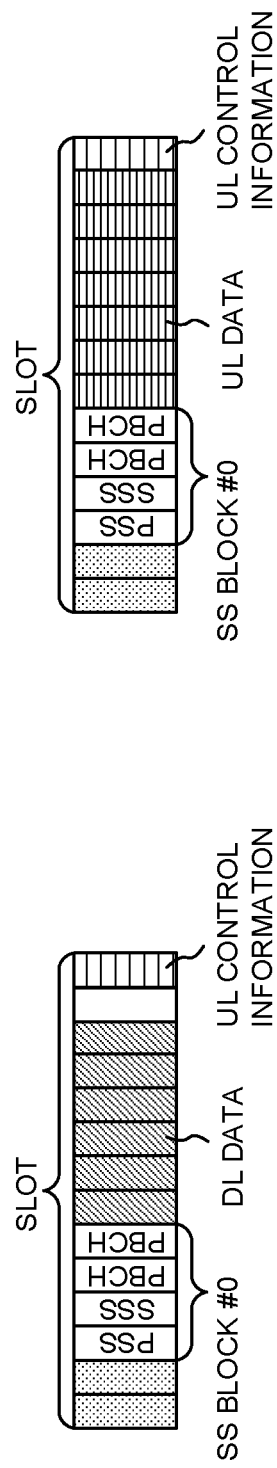

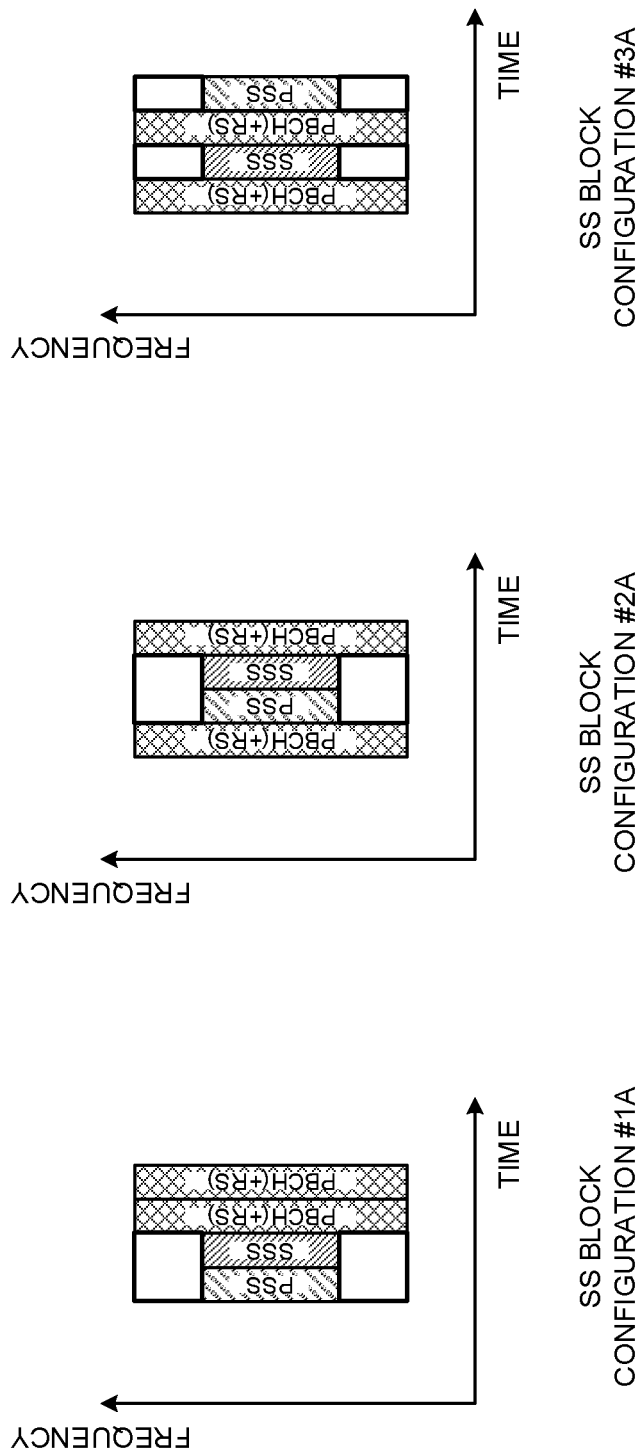

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," "LTE Rel. 12" or "LTE Rel. 13") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "NR (New Radio)," "NX (New radio access)," "FX (Future generation radio access)," "LTE Rel. 14," "LTE Rel. 15" or later versions) are under study.

In LTE Rel. 10/11, carrier aggregation (CA) to integrate multiple component carriers (CC) is introduced in order to achieve broadbandization. Each CC is configured with the system bandwidth of LTE Rel. 8 as one unit. In addition, in CA, multiple CCs under the same radio base station (eNB (eNodeB)) are configured in a user terminal (UE (User Equipment)).

Meanwhile, in LTE Rel. 12, dual connectivity (DC), in which multiple cell groups (CGs) formed with different radio base stations are configured in a UE, is also introduced. Each cell group is comprised of at least one cell (or CC). In DC, since multiple CCs of different radio base stations are integrated, DC is also referred to as "inter-eNB CA."

Also, in existing LTE systems (for example, LTE Rels. 8 to 13), synchronization signals (PSS/SSS), broadcast channel (PBCH) and so on which a user terminal uses in initial access procedures are allocated, on a fixed basis, in domain that is determined in advance. By detecting the synchronization signals in cell search, the user terminal can establish synchronization with the network, and, furthermore, identify the cell (for example, cell ID) which the user terminal should connect with. Furthermore, the user terminal can acquire system information by receiving the broadcast channel (PBCH and SIB) after the cell search.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

Future radio communication systems (for example, 5G, NR, etc.) are expected to realize various radio communication services so as to fulfill mutually varying requirements (for example, ultra high speed, large capacity, ultra-low latency, etc.). For example, regarding 5G/NR, studies are in progress to provide radio communication services, referred to as "eMBB (enhanced Mobile Broad Band)," "IoT (Internet of Things)," "mMTC (massive Machine Type Communication)," "M2M (Machine To Machine)," and "URLLC (Ultra Reliable and Low Latency Communications)."

In addition, 5G/NR is expected to support flexible use of numerologies and frequencies, and realize dynamic frame configurations. Here, "numerology" refers to communication parameters in the frequency direction and/or the time direction (for example, at least one of the subcarrier spacing (subcarrier interval), the bandwidth, the symbol duration, the time duration of CPs (CP duration), the subframe duration, the time duration of TTIs (TTI duration), the number of symbols per TTI, the radio frame configuration, the filtering process, the windowing process, and so on).

However, how to control transmission/receipt when different numerologies (subcarrier spacing, bandwidth etc.) from those of existing LTE systems are supported is not decided yet. In 5G/NR, a study is in progress to provide services using a very high carrier frequency of 100 GHz, and on the assumption that DL transmission is performed using different methods from those of existing LTE systems. For example, research is underway to transmit synchronization signals for use for initial access and/or other events and DL signal such as broadcast channels based on different configurations (for example, different mapping methods) from those of existing LTE systems.

In this case, control techniques (for example, signal mapping method) for use in existing LTE systems cannot be applied to DL transmission control in future radio communication systems on an as-is basis, and new transmission control methods are required.

The present invention has been made in view of the above, and it is therefore an object of the present invention to provide a user terminal and a radio communication method, whereby signals can be transmitted and received properly in a radio communication system where communication is carried out using different configurations than those of existing LTE systems.

Solution to Problem

In accordance with one aspect of the present invention, a user terminal has a receiving section that receives a synchronization signal arranged in a first frequency domain and a broadcast channel arranged in a second frequency domain, which is wider than the first frequency domain, and a control section that controls a receiving process of DL signals, and the control section controls the receiving process on the assumption that, in at least part of given frequency domain that neighbor (is contiguous with) the first frequency domain, no DL signal is mapped or a specific DL signal is mapped.

Advantageous Effects of Invention

According to the present invention, signals can be transmitted and received properly in a radio communication system where communication is carried out using different configurations than those of existing LTE systems.

BRIEF DESCRIPTION OF DRAWINGS

FIGS. 1A to 1C are diagrams to show examples of SS block configurations;

FIGS. 2A to 2C are diagrams to explain the concept of SS blocks;

FIGS. 3A to 3C are diagrams to explain unoccupied resources in SS block configurations;

DESCRIPTION OF EMBODIMENTS

Figure 4:
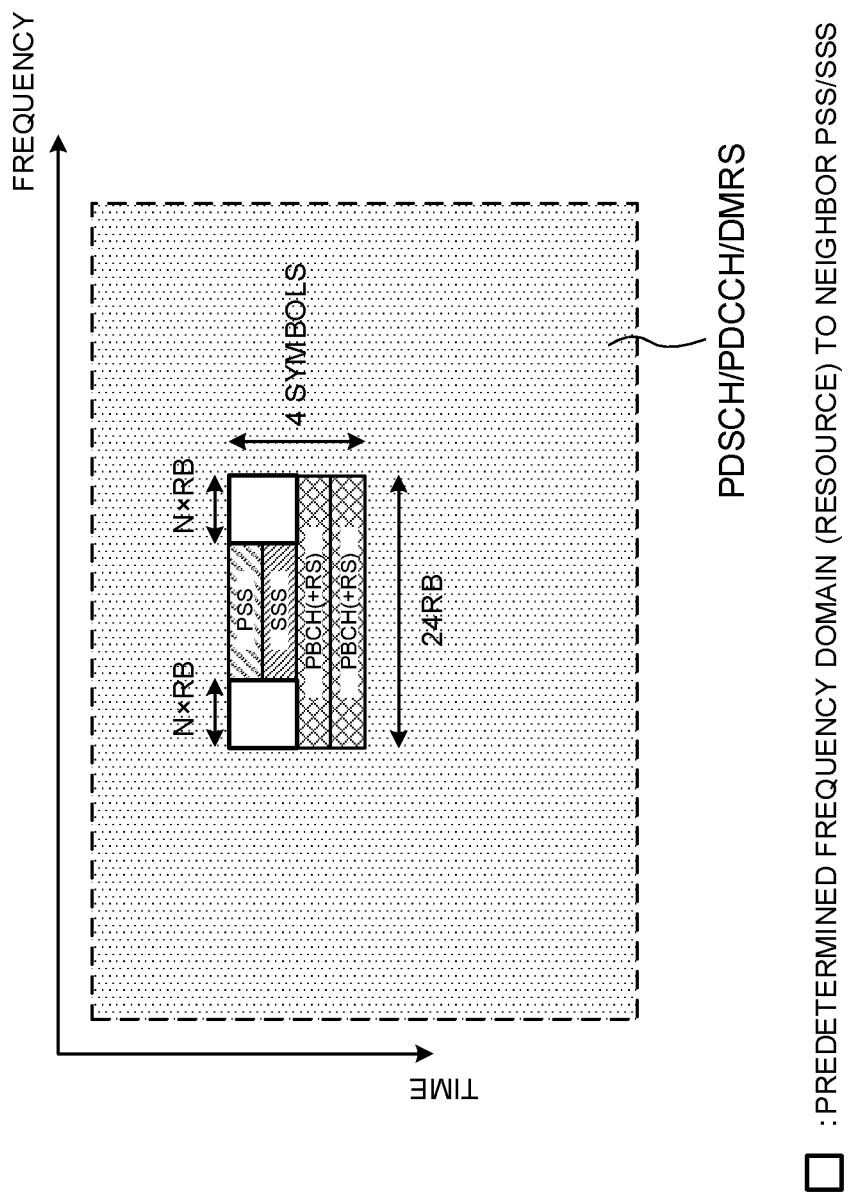
FIG. 4 is a diagram to show an example of the mapping configuration in an SS block.

In the initial access process in existing LTE systems, a user terminal can at least detect time/frequency synchronization and a cell indicator (cell ID) by detecting synchronization signals (PSS/SSS). Also, after having established synchronization with the network and captured the cell ID, the user terminal receives a broadcast channel (for example, PBCH) where system information is included. Following the detection of synchronization signals and demodulation of the broadcast channel, for example, SIBs (System Information Blocks) are received, a PRACH (Physical Random Access Channel) is transmitted, and so on.

As described above, in existing LTE systems, a user terminal receives the system information (broadcast information) that is necessary for downlink communication, in, for example, the MIB (Master Information Block), which is transmitted in the broadcast channel (PBCH). The broadcast channel for existing LTE systems (LTE-PBCH) is transmitted in subframe #0 in each radio frame, in a cycle of 10 msec, in a center band of 1.4 MHz (six RBs in the center).

In the PBCH (MIB), the information that is necessary to receive the downlink (downlink bandwidth, downlink control channel configuration, system frame number (SFN), etc.) is set forth using predetermined bits. A user terminal controls receipt of SIBs (System Information Blocks), which are communicated in the downlink shared data channel (PDSCH), based on the LTE-PBCH. By receiving SIBs, the user terminal can acquire minimum system information that is necessary to make communication.

Also, the locations to allocate synchronization signals (LTE-PSS/SSS) and the broadcast channel (LTE-PBCH) in existing LTE systems are fixed in time resources and frequency resources. To be more specific, LTE-PSS/SSS and the broadcast channel are mapped to the same frequency domain (for example, six RBs at the center frequency) and transmitted. Thus, LTE-PSS/SSS and LTE-PBCH are transmitted from radio base stations in fixed resources, so that LTE-PSS/SSS and LTE-PBCH can be received without sending a special notice to the user terminal.

Even in future radio communication systems, a user terminal needs to receive synchronization signals and system information (MIB and/or SIB) in the initial access process and so on in order to perform communication using a newly introduced carrier (also referred to as "NR carrier (cell)").

<SS Block>

5G/NR are under study to define a resource unit that contains at least synchronization signals (for example, NR-PSS and/or NR-SSS (hereinafter also referred to as "NR-PSS/SSS")) and a broadcast channel (for example, NR-PBCH) as an "SS block," and allow communication using SS blocks.

An SS block (Synchronization Signal block) is comprised of a plurality of consecutive OFDM symbols. For example, a symbol for NR-PSS, a symbol for NR-SSS and a symbol for NR-PBCH are arranged in a row. Furthermore, NR-PBCH may be arranged in a plurality of symbols (for example, two symbols), and, in this case, the SS block is constituted by one symbol for NR-PSS, one symbol for NR-SSS and two symbols for NR-PBCH.

The order of arranging NR-PSS, NR-SSS and NR-PBCH may be NR-PSS, NR-SSS and NR-PBCH, in order (SS block configuration 1A in FIG. 1A). Alternatively, a configuration may be employed here in which a plurality of (for example, two) NR-PBCHs sandwich NR-PSS and NR-SSS (SS block configuration 2A in FIG. 1B), or NR-PBCH, NR-SSS, NR-PBCH and NR-PSS may be arranged in order (SS block configuration 3A in FIG. 1C). Note that the SS block configurations need not be limited to the configurations shown in FIG. 1 as long as NR-PSS, NR-SSS and NR-PBCH are arranged in a row.

Also, NR-PSS/SSS and NR-PBCH may be configured to be mapped to different frequency domain (or frequency bands). For example, NR-PSS/SSS may be mapped to a first frequency domain (which is, for example, 127 subcarriers), and NR-PBCH may be mapped to a second frequency domain (which is, for example, 288 subcarriers), which is wider than the first frequency domain (see FIG. 1). In this case, NR-PSS/SSS are each mapped to 127 subcarriers×one symbol, and NR-PBCH is mapped to 288 subcarriers×two symbols. Also, the reference signal (for example, DMRS) for use for demodulating NR-PBCH may be mapped to the second frequency domain. Note that the number of subcarriers that constitute NR-PSS/SSS and NR-PBCH is not limited to the above values.

Alternatively, NR-PSS/SSS and NR-PBCH may be mapped to the same frequency domain (bandwidth). Furthermore, whether NR-PSS/SSS and NR-PBCH have the same bandwidth or different bandwidths may be configured separately per frequency band (for example, per carrier, per CC, etc.).

The first frequency domain where NR-PSS/SSS is mapped and the second frequency domain where NR-PBCH is mapped may be arranged to overlap each other, at least partially. This will reduce the frequency domain where the UE has to perform SS block receiving processes in initial access, and so on. From the perspective of reducing the frequency domain where the UE has to monitor SS blocks, it is preferable to map NR-PSS/SSS and NR-PBCH such that the first frequency domain is included in the range of the second frequency domain.

A base station may report information related to the time index of the SS block to the UE via NR-PBCH. The UE can receive NR-PBCH included in the SS block, and, by this means, identify the time index (time-related information) of the SS block received.

The SS block at least contains PSS (NR-PSS), SSS (NR-SSS) and PBCH (NR-PBCH) (see FIG. 2). Note that a synchronization signal (TSS (Tertiary SS)) that is different from PSS and SSS may be included in the SS block. FIG. 2A shows an example of an SS block in a multi-beam scenario, and FIGS. 2B and 2C show examples of SS blocks in a single beam scenario (FIG. 2B shows a DL data transmission slot, and FIG. 2C shows a UL data transmission slot).

The user terminal detects NR-PSS/SSS/PBCH corresponding to the same SS block index. PSS, SSS, and PBCH that correspond to the same SS block index are associated with each other. For example, the user terminal may assume that PSS, SSS and PBCH that correspond to the same SS block index are transmitted in the same beam (or the same precoding is applied). Note that, in the following description, PSS, SSS and PBCH may be read as PSS for NR (NR-PSS), SSS for NR (NR-SSS) and PBCH for NR (NR-PBCH), respectively.

A set of one or multiple SS blocks may be referred to as an "SS burst." An SS burst may be formed with SS blocks with consecutive frequency and/or time resources, or may be formed with SS blocks with non-consecutive frequency and/or time resources. It is preferable that SS bursts are transmitted in a predetermined cycle (which may be referred to as "SS burst cycle"). Alternatively, SS bursts may not be transmitted on a regular basis (and may be transmitted aperiodically).

Also, one or more SS bursts may be referred to as an "SS burst set (SS burst series)." For example, the base station and/or the UE may apply beam sweeping to PSS/SSS/PBCH by using one or more SS bursts included in one SS burst set, and transmit these signals. Note that SS burst sets are transmitted periodically. The UE may control the receiving process on the assumption that SS burst sets are transmitted periodically (in the SS burst set cycle).

A configuration may be adopted here in which candidate locations for SS blocks are specified by the specification, on a per frequency band basis, so that the user terminal can identify the indices of SS blocks from the signals in the SS blocks. This allows the user terminal to identify SS block indices from one or more signals in SS blocks. Also, by determining candidate locations of SS blocks in advance, it is possible to reduce the number of bits required to report SS block indices.

For example, when the base station places an SS block index in PBCH and transmits this to the user terminal, the user terminal can acquire the SS block index from the PBCH received. Then, the user terminal identifies the time index (symbol number, slot number, etc.) corresponding to the SS block index that is acquired.

Now, in future radio communication systems (5G/NR), multiple numerologies may be configured in some cases. Also, 5G/NR are under study to provide services using a very high carrier frequency of 100 GHz, and assumed to transmit and receive signals in different methods from those of existing LTE systems. For example, research is underway to transmit synchronization signals for use for controlling initial access and other events and DL signals such as a broadcast channel based on different configurations (for example, different mapping methods) from those of existing LTE systems.

For example, as shown in FIG. 1, it is assumed that NR-PSS/SSS may be mapped to a first frequency domain (which is, for example, 127 subcarriers), and NR-PBCH may be mapped to a second frequency domain (which is, for example, 288 subcarriers), which is wider than the first frequency domain.

In this way, when the resources (for example, the number of RBs and/or the number of subcarriers) where NR-PSS/SSS is mapped are different from the resources where NR-PBCH is mapped, resources where NR-PSS/SSS and NR-PBCH do not overlap may be produced in SS blocks (see FIGS. 3A to 3C).

In this case, unoccupied resources, in which no synchronization signal is located, are produced only in part of the symbols in given resource units (for example, subframes, slots, etc.) where SS blocks are arranged. When DL data is transmitted using these unoccupied resources, the receiving operation at the UE may become complicated.

In existing LTE systems (Rel. 13 or earlier versions), synchronization signals (PSS/SSS) and the broadcast channel (PBCH) are mapped to the same frequency domain (six RBs), and transmission is controlled accordingly. Also, while five subcarriers of unoccupied resources are present at both ends of the PSS/SSS domain, there are few unoccupied resources. Meanwhile, 5G/NR assume the case where, for example, NR-PSS/SSS is transmitted using 127 subcarriers, NR-PBCH is transmitted using 288 subcarriers, and their center frequencies are aligned. In this case, six RBs of unoccupied resources (resources where no synchronization signal is allocated) (total 144 subcarriers×two symbols) are produced from both ends of NR-PSS/SSS, and how to use these resources becomes the problem.

The present inventors have focused on the fact that unoccupied resources are produced in resources (for example, neighboring resources) on the outside of synchronization signals (NR-PSS/SSS) in future communication systems, and come up with the idea of setting forth the receiving operation of UEs with respect to these neighboring resources and allowing proper receiving processes.

According to one aspect of the present embodiment, in at least part of the resources that are frequency-multiplexed with NR-PSS/SSS (for example, resources that neighbor NR-PSS/SSS), a UE controls receiving processes without assuming that DL signals are transmitted. Alternatively, the UE controls receiving processes on the assumption that specific DL signals and/or DL channels are mapped, in at least part of the resources that neighbor NR-PSS/SSS.

Now, embodiments of the present invention will be described in detail below with reference to the accompanying drawings. Note that the configurations according to each embodiment may be applied individually or may be applied in combination. Also, although the following description will assume that the center frequencies of PSS/SSS and PBCH, which are mapped to different frequency domain, are aligned, this is by no means limiting. For example, the present invention can be applied to configurations in which the frequency domain for PSS/SSS and the frequency domain for PBCH overlap at least in part. Furthermore, although cases will be exemplified in the following description where the frequency domain for NR-PSS/SSS and the frequency domain for NR-PBCH are configured different, the present invention can be equally applied to cases where the frequency domain for NR-PSS/SSS and the frequency domain for NR-PBCH are configured the same. Also, although the following description will illustrate resources that are frequency-multiplexed with NR-PSS/SSS (for example, frequency domain that neighbor NR-PBCH), the present invention may be likewise applied to resources that are frequency-multiplexed with NR-PBCH (for example, frequency domain that neighbor NR-PBCH).

(First Aspect)

In accordance with a first aspect of the present invention, a configuration will be described in which a user terminal receives no DL signals and/or DL channels (hereinafter referred to as "DL signals/DL channels" or simply "DL signals") in at least part of the resources that are frequency-multiplexed with NR-PSS/SSS.

FIG. 4 shows a configuration in which no DL signal is mapped to a user terminal in one or both given frequency domain (resources) that neighbors (is contiguous with) NR-PSS/SSS. FIG. 4 shows a case where part of the frequency domain of NR-PBCH and the whole of the frequency domain of NR-PSS/SSS overlap, and where NR-PBCH and NR-PSS/SSS do not overlap in given frequency domain that neighbors NR-PSS/SSS (for example, 2×N×RBs).

In at least part of the given frequency domain (for example, six RBs) that neighbors NR-PSS/SSS, the user terminal performs receiving processes without assuming that DL signals/DL channels may be mapped (or transmitted). For example, the user terminal may assume that no DL signal/DL channel is transmitted in frequency domain that is one RB from both ends of NR-PSS/SSS.

Note that the given frequency domain to neighbor NR-PSS/SSS may be domain that does not overlap NR-PSS/SSS in the frequency domain of NR-PBCH (see FIG. 4), or may be given domain that is selected in advance. The given domain that is selected in advance may be, for example, domain to include, in addition to a domain overlapping with NR-PBCH, a non-overlapping frequency domain (frequency domain that is wider than the end of NR-PBCH). Note that, when the frequency domain for NR-PSS/SSS and the frequency domain for NR-PBCH are configured the same, the given frequency domain to neighbor NR-PSS/SSS may be designated in advance, or may be configured and reported to the user terminal.

In this way, the user terminal performs receiving processes on the assumption that no DL signal is transmitted in given frequency domain, so that the user terminal has only to filter the band of NR-PSS/SSS, selectively, when operating at a low sampling rate in order to receive NR-PSS/SSS. As a result, in NR-PSS/SSS receiving processes, the user terminal does not need to use a filter that has high performance (for example, sharp characteristics).

Furthermore, in one or both of the given frequency domain that neighbors NR-PSS/SSS, a field (for example, the value M to represent the number of RBs and/or the number of subcarriers) in which no DL signal is mapped may be defined in the specification, or may be configured and reported to the user terminal.

It also might occur that another DL signal is scheduled in a resource unit (for example, a slot, a subframe, etc.) where an SS block is transmitted. This another DL signal may be, for example, at least one of downlink data channel (for example, PDSCH), a downlink control channel (for example, PDCCH/EPDCCH), a reference signal that is used to demodulating PDSCH and/or PDCCH (for example, DMRS), and a reference signal for measurement use (for example, CSI-RS).

In this case, the user terminal may perform rate matching on the assumption that DL signals are not mapped in the resources of NR-PSS/SSS and NR-PBCH (the demodulation reference signals for NR-PBCH may be included) and at least a part of the given frequency domain that neighbors (is contiguous with) NR-PSS/SSS. At least part of the given frequency domain that neighbors NR-PSS/SSS may be resources of N RBs from both ends of NR-PSS/SSS.

The symbols that are subject to rate matching in a resource unit may be limited to the symbols (for example, four symbols) where the SS block is included, or may be the entire frequency domain (for example, twenty-four RBs) of the symbols in the resource unit where the SS block is included.

When a configuration in which no DL signal is mapped to resources where an SS block is located is employed, mapping may be performed so that SS blocks are located in coordinated locations even in nearby cells. With this configuration, it is possible to reduce the interference from DL signals (for example, data signals) when the user terminal receives SS blocks, so that the accuracy of receipt of SS blocks and/or the accuracy of measurements can be improved. Note that the resource to which the SS block is allocated is, for example, equivalent to twenty-four RBs× four symbols, or equivalent to all symbols of a resource unit including twenty-four RBs×SS blocks.

In this way, by adopting a configuration in which no DL signal is mapped in at least part of given frequency domain that neighbors NR-PSS/SSS (for example, N RBs from both ends of NR-PSS/SSS), the load of receiving processes in the user terminal can be reduced. For example, in the filtering process that is performed on the user terminal side when receiving NR-PSS/SSS at a low sampling rate, it is possible to make a high-performance filter unnecessary.

(Second Aspect)

In accordance with a second aspect of the present invention, a configuration will be described in which whether or not DL signals are mapped to SS block resources (for example, twenty-four RBs×four symbols) is reported from the network (for example, a base station) to a user terminal. The user terminal controls receiving processes for the SS block resources, on the assumption that DL signals are either mapped or not mapped, based on the report from the base station.

Figure 5:
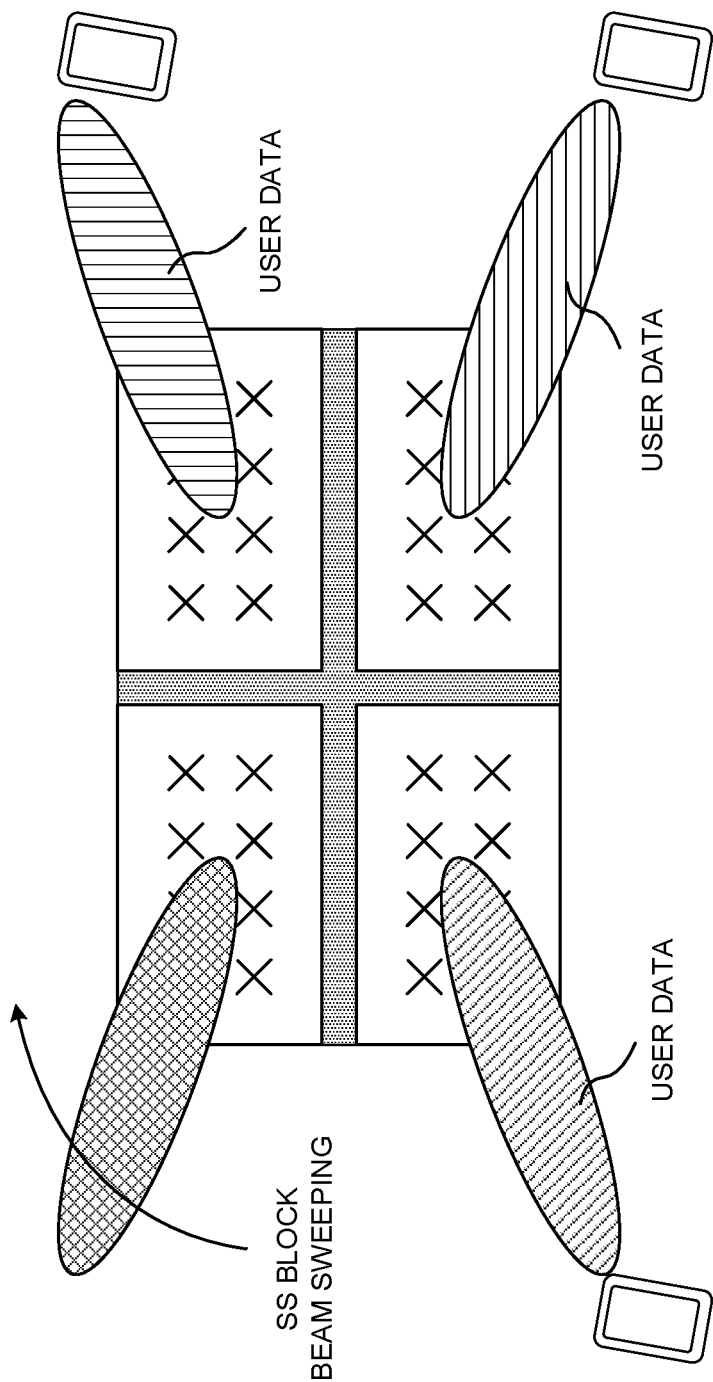
FIG. 5 is a diagram to show an example of the method of transmission from a plurality of antenna panels.

FIG. 5 shows examples of a plurality of antenna panels provided in the base station. An antenna panel may be comprised of a plurality of antenna elements. For example, an antenna that is comprised of a very large number of elements may be used to implement massive MIMO (Multiple Input Multiple Output). When an antenna comprised of a very large number of elements is used, beams (antenna directivity) can be formed by controlling the amplitude and/or the phase of signals transmitted/received through each element. An antenna panel may be referred to as an "antenna port group" or "TXRU (Transceiver Unit) configuration."

FIG. 5 shows a case where DL transmission is performed by applying different beam forming (or precoding process) from each of four panels. For example, a case will be assumed here where SS blocks are transmitted using part of a plurality of antenna panels, and data is transmitted using the rest of the antenna panels. In this case, it is possible to transmit data, to which different beam forming is applied, in SS block resources where SS blocks are mapped. The user terminal can also receive NR-PSS/SSS and NR-PBCH, to which a first beam is applied, and data, to which a second beam is applied, in SS block resources. Note that SS block resources may be part or all of the frequency domain that neighbors NR-PSS/SSS.

The base station may report (signal) information as to whether or not DL signals are mapped in SS block resources, to the user terminal, in advance. For the signaling to the user terminal, at least one of a broadcast channel (MIB (for example, PBCH), and/or SIB (for example, PDSCH to contain system information)), MAC signaling (for example, MAC CE), a common control channel (for example, common PDCCH), and a downlink control channel (for example, UE-specific PDCCH) for scheduling data (for example, PDSCH) may be used.

The user terminal may report capability information (UE capability) to indicate whether or not the user terminal is capable of performing SS block receiving processes and DL signal (for example, data, etc.) receiving processes at the same time, to the network, in advance. By this means, the base station can selectively map DL signals, for specific user terminals, in SS block resources.

Also, given that a configuration is employed here in which whether or not DL signals are mapped to SS block resources is indicated to the UE by way of signaling, mapping of DL signals to SS block resources can be flexibly controlled according to the antenna configuration in the base station and so on. As a result of this, the efficiency of the use of resources can be improved according to the configuration of the base station and so on.

(Third Aspect)

In accordance with a third aspect of the present invention, a configuration will be described in which a specific DL signal/DL channel is mapped at least to part of given frequency resources that neighbor NR-PSS/SSS.

Figure 6:
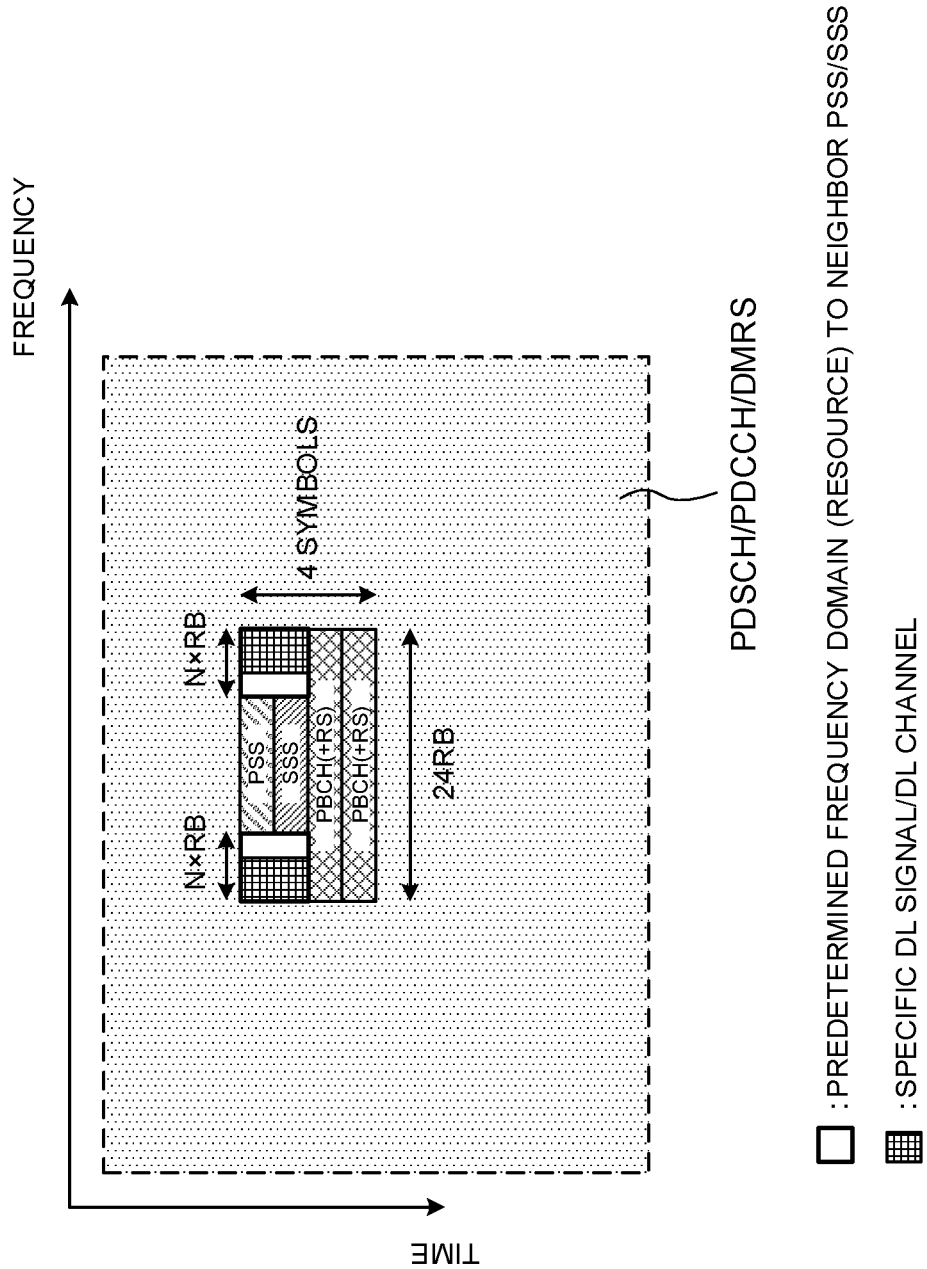
FIG. 6 is a diagram to show an example of mapping configuration in an SS block.

FIG. 6 shows a case where a specific DL signal/DL channel is mapped to at least part of one or both frequency domain that neighbors NR-PSS/SSS. FIG. 6 shows a case where part of the frequency domain of NR-PBCH and the whole of the frequency domain of NR-PSS/SSS overlap, and where, in each predetermined frequency domain (for example, six RBs each) that neighbors NR-PSS/SSS, NR-PBCH and NR-PSS/SSS do not overlap.

Figure 7:
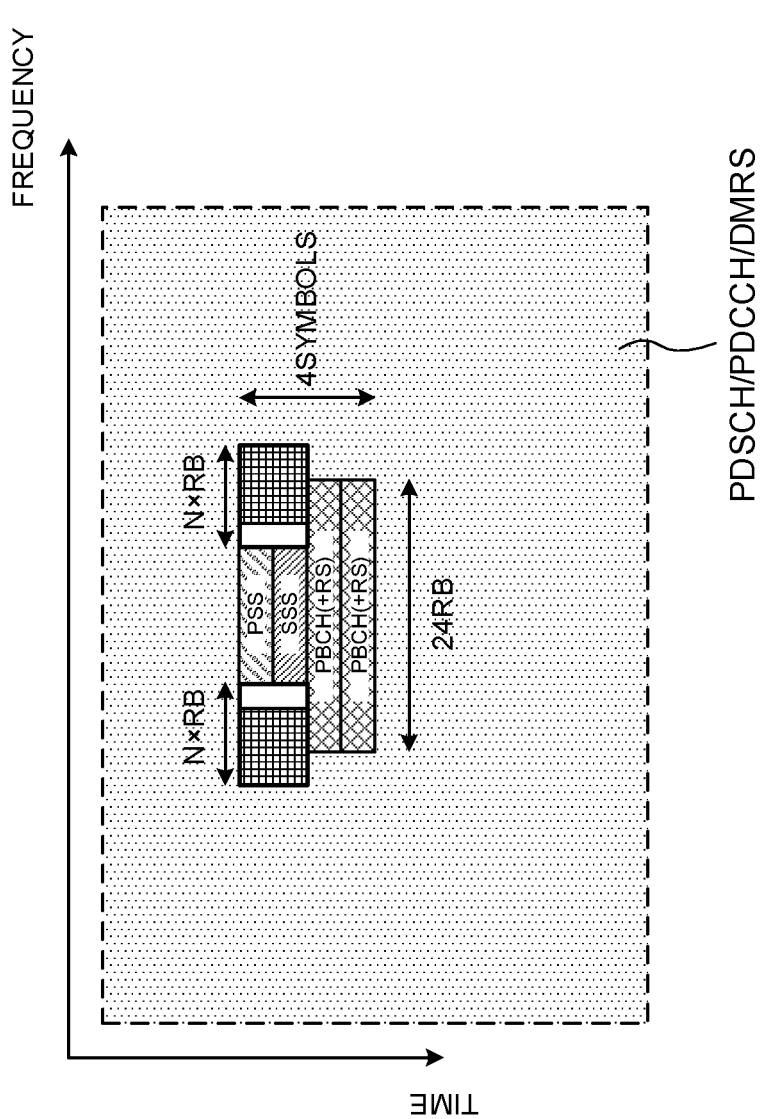
FIG. 7 is a diagram to show another example of mapping configuration in an SS block.

FIG. 6 shows a case where the given frequency domain that neighbors NR-PBCH are domain that does not overlap with NR-PSS/SSS in NR-PBCH's frequency domain, the domain for mapping a specific DL signal is not limited to these. In addition to domain that overlaps with NR-PBCH, domain that extends to non-overlapping frequency domain may be defined as given frequency domain (frequency domain that widens beyond the ends of NR-PBCH), and a specific DL signal may be mapped (see FIG. 7).

The user terminal performs receiving processes on the assumption that a specific DL signal/DL channel is mapped in at least part of given frequency domain that neighbors NR-PSS/SSS. For example, the user terminal may assume that a specific DL signal/DL channel is transmitted in frequency domain (for example, five RBs) that shiftes by one RB from both ends of NR-PSS/SSS.

The specific DL signal/DL channel may be at least one of an enhanced SS, a reference signal, a control channel and a broadcast channel. For example, using part or the whole of the frequency domain that neighbors NR-PSS/SSS, the user terminal at least transmits an enhanced SS, transmits a reference signal, transmits a control channel or transmits a broadcast channel. The reference signal may be a reference signal for use for demodulating the broadcast channel (PBCH), and/or a reference signal to use in RRM measurements. The control channel may be a common control channel (for example, common PDCCH). The broadcast channel may be a channel to use to report paging.

The specific DL signal may be mapped to a resource (for example, an RB) that neighbors NR-PSS/SSS, or mapped to a resource that is a given space (for example, several RBs) away from NR-PSS/SSS. The location to map the specific DL signal/DL channel may be defined in advance in the specification, or may be reported from the base station to the user terminal by way of signaling.

Also, whether or not a specific DL signal/DL channel is mapped may be configured from the network (for example, base station) to the user terminal by way of signaling. As for the signaling to the user terminal, at least one of a broadcast channel (MIB (for example PBCH) and/or SIB (for example, PDSCH to contain system information)), MAC signaling (for example, MAC CE), a common control channel (for example, common PDCCH), and a downlink control channel (for example, UE-specific PDCCH) that schedules data (for example PDSCH) may be used.

The user terminal can assume whether a specific DL signal is mapped or not, based on the signaling from the base station, and control receiving processes in given frequency domain that neighbors NR-PSS/SSS.

A specific DL signal/DL channel is transmitted using at least part of given frequency domain that neighbors NR-PSS/SSS, so that the efficiency of the use of resources can be improved. Also, the beamforming (or precoding, beam index, etc.) to apply to NR-PSS/SSS may be applied to the specific DL signal/DL channel. In particular, when multi-beam operation is employed, the base station frequency-multiplexes (FDM) DL signals that require beam sweeping with NR-PSS/SSS and sweeps these signals together, so that the time overhead of beam sweeping can be reduced.

Now, cases will be described below in which an enhanced SS, a reference signal, a control channel, and a broadcast channel are each used as a specific DL signal.

<Enhanced SS>

Figure 8:
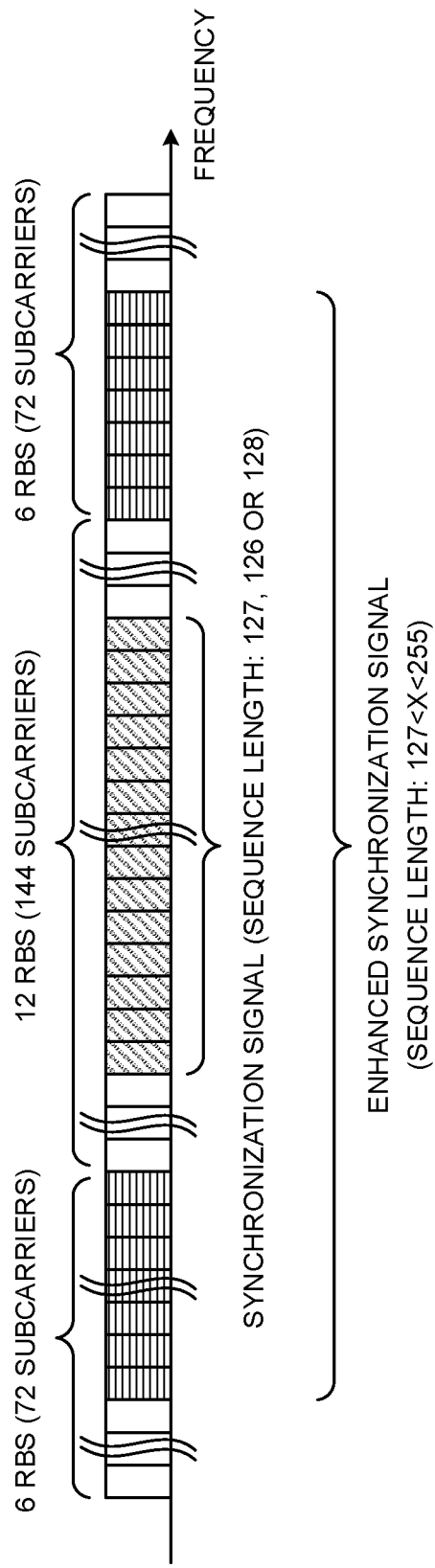
FIG. 8 is a diagram to show an example of an enhanced synchronizing signal to allocate to neighboring resources of a synchronization signal.

FIG. 8 shows a case where an enhanced SS is transmitted using given frequency domain that neighbors NR-PSS/SSS. FIG. 8 shows the case where NR-PSS/SSS are mapped to twelve RBs (144 subcarriers) and where enhanced SS is mapped to six RBs (72 subcarriers) from both ends of NR-PSS/SSS. Obviously, the resources for mapping NR-PSS/SSS and the enhanced SS are not limited to these.

The user terminal may assume, based on signaling from the base station or information that is defined in advance in the specification, that an enhanced SS is mapped to part of one or both frequency domain that neighbor NR-PSS/SSS, and perform operations such as cell detection and/or RRM measurements accordingly.

The user terminal may use one of NR-PSS/SSS and the enhanced SS in given operations, and use both NR-PSS/SSS and the enhanced SS in other operations. For example, the user terminal uses one of NR-PSS/SSS in initial cell search, and use both NR-PSS/SSS and the enhanced SSS in operations after connection is established with the base station (for example, cell detection and/or RRM measurements).

The user terminal can reduce power consumption by detecting NR-PSS/SSS in a given frequency band (for example, a bandwidth of twelve RBs). In addition, when the user terminal is in the connected state (for example, IDLE and/or CONNECTED), the user terminal can detect NR-PSS/SSS and the enhanced SS in a given frequency band (for example, a band of twenty-four RBs), so that the performance of detection and/or the accuracy of RRM measurement can be improved. In particular, in the state after connection is established with the network, detection of the enhanced SS in a given frequency domain, in addition to NR-PSS/SSS, may be commanded from the base station to the user terminal by way of signaling.

As for the configuration (design) of the enhanced SS, the configurations of NR-PSS/SSS may be used, or a sequence and/or ID (for example, a beam ID and/or a transmission/receiving point ID) that are different from those of NR-PSS/SSS may be applied to the enhanced SS. Using configurations for NR-PSS/SSS might mean, for example, applying the same number of sequences and/or IDs as those of NR-PSS/SSS to the enhanced SS, or changing part of the configurations of NR-PSS/SSS and applying these to enhanced SS.

For example, to use configurations for NR-PSS/SSS configuration as configurations for the enhanced SS, for example, a sequence that is comprised of a0 to a127 may be prepared, and a0 to a63 may be mapped to the resource of one enhanced SS neighboring NR-PSS/SSS, while a64 to a127 may be mapped to the resource of the other enhanced SS. In this way, by applying configurations of NR-PSS/SSS to configurations of the enhanced SS, the receiving process at the user terminal can be simplified.

The enhanced SS may be transmitted in the same cycle as that of NR-PSS/SSS, or transmitted in a different cycle. Furthermore, the enhanced SS may be transmitted in one of the resources that neighbor NR-PSS/SSS, or transmitted in both. By controlling transmission of NR-PSS/SSS and transmission of enhanced SS in this way, it is possible to use each synchronization signal, selectively, according to the application.

<Reference Signal>

Figure 9:
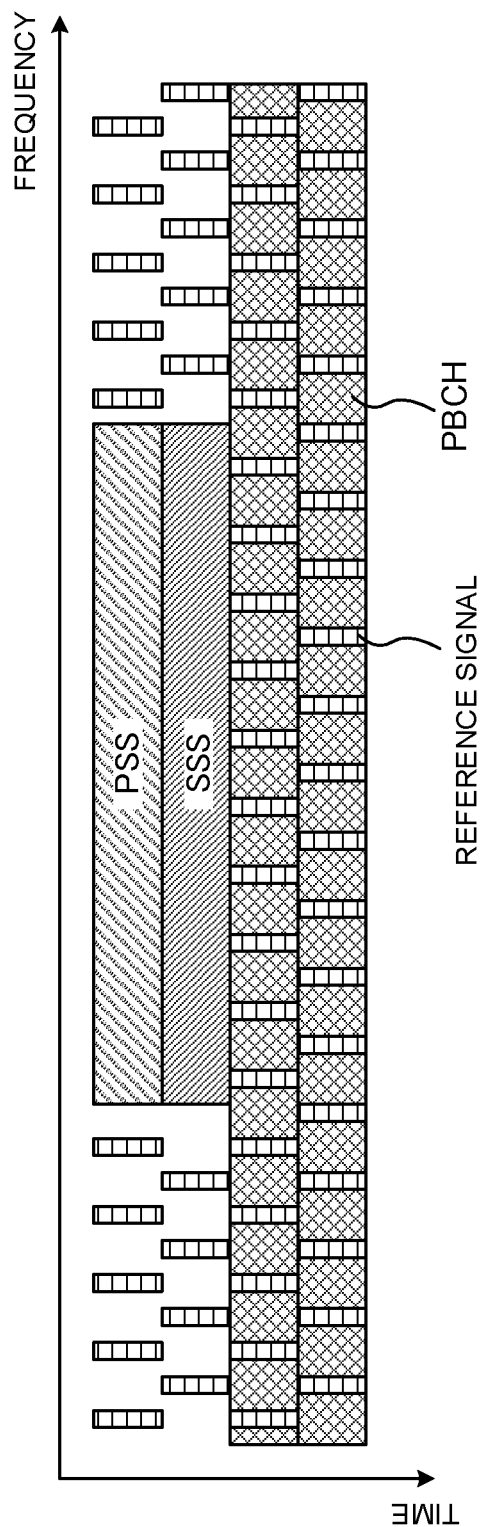
FIG. 9 is a diagram to show examples of reference signals to allocate to neighboring resources of a synchronization signal.

FIG. 9 shows a case where a reference signal is transmitted using given frequency domain that neighbors NR-PSS/SSS. FIG. 9 shows a case where reference signals are mapped in different locations in given frequency domain that neighbors NR-PSS/SSS. These reference signals can be used to demodulate NR-PBCH and/or to measure RRM.

Although FIG. 9 shows a case where reference signals are also mapped to RBs that neighbor NR-PSS/SSS, a configuration may be employed here in which no reference signal is mapped within a predetermined interval (for example, in the closest N RBs) from both ends of NR-PSS/SSS.

For the mapping configuration of reference signal sequences in at least part of given frequency domain that neighbors NR-PSS, the mapping configuration of reference signal sequences in NR-PBCH symbols may be used (re-used). For example, as shown in FIG. 9, in a configuration in which NR-PBCH symbols (two symbols in this case) are continuous, the mapping pattern of the reference signal in each symbol may be applied to a symbol neighbor NR-PSS and a symbol neighbor NR-SSS.

For example, if the locations of reference signals are shifted (or aligned) between two NR-PBCH symbols, the locations of reference signals are also shifted (or aligned) between symbols that neighbor NR-PSS and symbols that neighbor NR-SSS. This makes it possible to make the mapping pattern of the reference signal in each symbol of NR-PSS/SSS the same as the mapping pattern of the reference signal in the symbol of NR-PBCH.

Alternatively, the mapping configuration of reference signal sequences in at least part of frequency domain that neighbors NR-PSS/SSS may be a different mapping/configuration from that for mapping reference signal sequences in NR-PBCH symbols. For example, in frequency domain that neighbors NR-PSS/SSS, reference signals may be mapped to subcarriers that are different from the subcarriers to which reference signals are mapped in the two symbols of NR-PBCH. This makes it possible to distribute the locations to map reference signals in the frequency direction, and it is possible to improve the accuracy of channel estimation of NR-PBCH.

Reference signals that are transmitted in at least part of given frequency domain that neighbors NR-PSS/SSS may be used to report specific information to the user terminal. For example, by using at least one of reference signal sequences that are mapped in given frequency domain that neighbors NR-PSS/SSS, cyclic shift and OCC, at least one of the beam ID, the transmitting/receiving point ID, information to indicate part or all of SS block indices, and index of resource unit is reported to the user terminal. The specific information and the configurations of reference signals may be associated with each other in advance. By applying the configurations of reference signals to report specific information to the user terminal, the overhead of signaling can be reduced.

Note that the reference signals to map to frequency domain that neighbors NR-PSS/SSS are not limited to the reference signal for use for demodulating NR-PBCH. The reference signals may be some or all of the reference signals for channel state measurements (for example, CSI-RS for L3 mobility), some or all of the reference signals for phase tracking.

<Control Channel>

A downlink control channel may be transmitted using given frequency domain that neighbors NR-PSS/SSS. For example, given frequency domain that neighbors NR-PSS/SSS may be used as part or all of a user-common (UE-common) or user group-common (UE-group-common) search space.

Given frequency domain that neighbors NR-PSS/SSS are used as resources for PDCCH for scheduling SIBs and/or paging messages and so on, the beam sweeping for SS blocks can be applied (the same BF can be applied) together, and transmission can be made accordingly. Also, the common search space may be placed in neighboring resources at both ends of NR-PSS/SSS across NR-PSS/SSS. By this means, a frequency diversity effect can be provided.

Furthermore, given frequency domain to neighbor NR-PSS/SSS may be used only for transmission of a user terminal (or user group)-common PDCCH, which is used for specific use cases such as reporting paging (for example, reporting updates of SIBs, and triggering beam reports from user terminals) and others. By this means, signals for users (or user groups) in the beam to be sent together (applying the same BF) using the beam for the SS block, like a paging report.

<Broadcast Channel>

A broadcast channel may be transmitted using given frequency domain that neighbors NR-PSS/SSS. For example, a given frequency domain to neighbor NR-PSS/SSS may be used as at least part of the resources for transmitting a channel that is not scheduled (non-scheduled channel). For example, when a physical channel format that is different from that of PDCCH is applied to paging indication and others, frequency domain that neighbors NR-PSS/SSS may be used as part or all of the resources for allocating the physical channel. This allows the broadcast channel for users (or user groups) in the beam to be transmitted together (applying the same BF) with the beam for the SS block.

(Variations)

Figure 10:
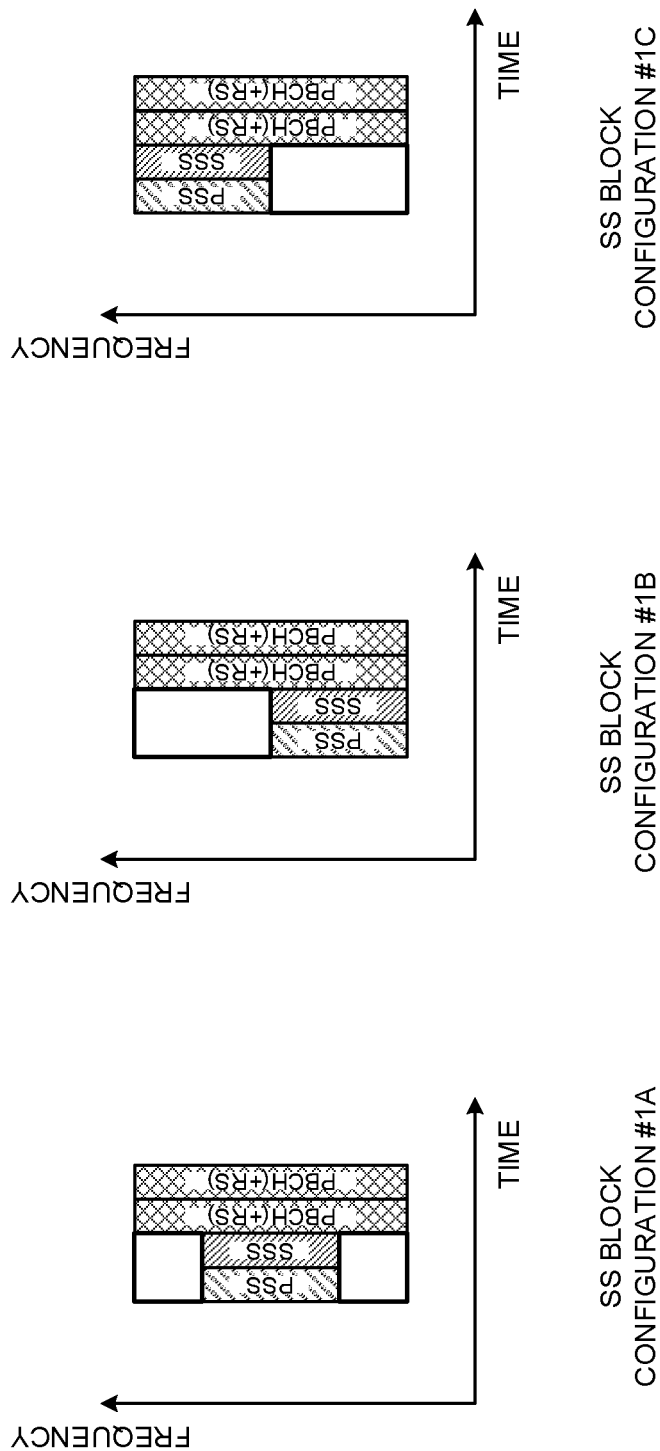
FIGS. 10A to 10C are diagrams to show other examples of SS block configurations.

Now, although cases have been described with the above embodiments in which the centers of the frequencies of NR-PSS/SSS and NR-PBCH are aligned in SS blocks, this is by no means limiting. At least one of NR-PSS, NR-SSS, and NR-PBCH may have a different center frequency. FIG. 10A shows a configuration (SS block configuration 1A), in which the center of the frequency of NR-PSS/SSS and the center of the frequency of NR-PBCH are the same. FIGS. 10B and 10C show configurations (SS block configuration 1B and SS block configuration 1C), in which the center of the frequency of NR-PSS/SSS is different from the center of the frequency of NR-PBCH. Obviously, the SS block configurations that can be applied are not limited to these.

A plurality of SS blocks may be configured in the user terminal. If one of multiple SS block configurations is configured, after the user terminal detects NR-PSS/SSS, the user terminal may control detection of NR-PBCH assuming that there are multiple candidates for the frequency location of NR-PBCH, which is determined with respect to the location of NR-PSS/SSS. This makes it possible to control the mapping of NR-PSS/SSS and NR-PBCH in a flexible manner.

Alternatively, the relative location of NR-PBCH with respect to NR-PSS/SSS may be configured to associate with specific information, respectively. The user terminal can acquire specific information based on the location of NR-PBCH detected. For example, information related to predetermined SS block indices (for example, part of the SS block indices) may be associated with each relative location of NR-PBCH for NR-PSS/SSS. Thus, the overhead of signaling can be reduced.

Alternatively, information related to the index of a given resource unit (for example, part of the subframe indices) may be associated with each relative location of NR-PBCH with respect to NR-PSS/SSS. Alternatively, information related to the index of a given beam and/or transmitting/receiving point (for example, part of the beam and/or TRP IDs) may be associated with each relative location of NR-PBCH for NR-PSS/SSS.

Also, information to indicate whether the relative location of NR-PBCH with respect to NR-PSS/SSS is always fixed or not may be reported from the network to the user terminal by way of signaling. By this means, it is possible to flexibly control mapping of NR-PSS/SSS and NR-PBCH depending on the communicating environment and so on.

(Radio Communication System)

Now, the structure of the radio communication system according to one embodiment of the present invention will be described below. In this radio communication system, communication is performed using one or a combination of the herein-contained embodiments of the present invention.

Figure 11:
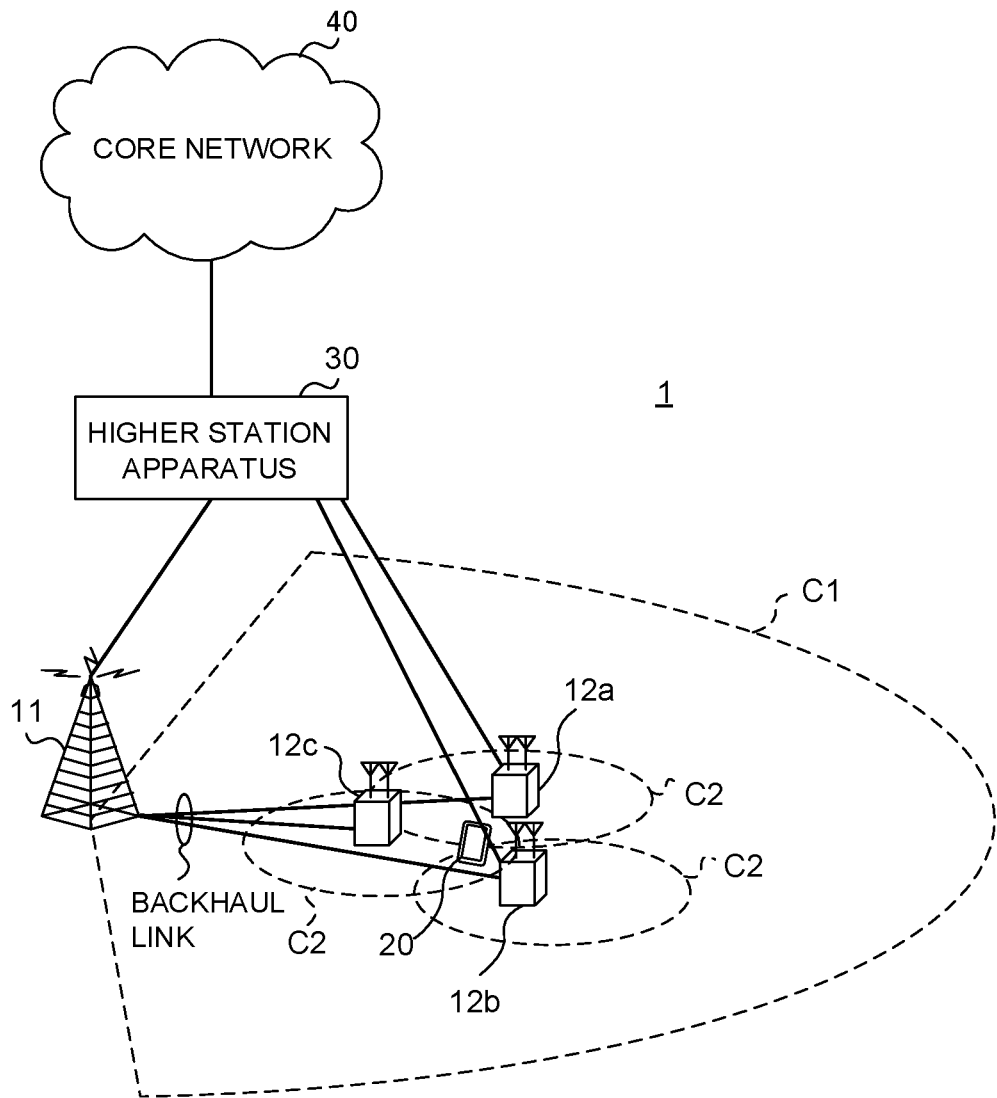
FIG. 11 is a diagram to show an example of a schematic structure of a radio communication system according to one embodiment of the present invention.

FIG. 11 is a diagram to show an example of a schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 includes a radio base station 11 that forms a macro cell C1, which has a relatively wide coverage, and radio base stations 12a to 12c that are placed within the macro cell C1 and that form small cells C2, which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs). For example, in DC, MeNB (MCG) communicates using LTE cells, and SeNB (SCG) communicates using NR/5G cells.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that, uplink and downlink radio access schemes are not limited to these combinations, and other radio access schemes may be used.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information and SIBs (System Information Blocks) are communicated in the PDSCH. Also, the MIB (Master Information Block) is communicated in the PBCH. A shared control channel that reports the presence or absence of a paging channel is mapped to a downlink L1/L2 control channel (for example, PDCCH), and the data of the paging channel (PCH) is mapped to the PDSCH. Downlink reference signals, uplink reference signals and physical downlink synchronization signals are separately arranged.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated in the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data and higher layer control information are communicated by the PUSCH. Also, downlink radio quality information (CQI (Channel Quality Indicator)), delivery acknowledgement information and so on are communicated by the PUCCH. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRSs (Sounding Reference Signals)), demodulation reference signals (DMRSs) and so on are communicated as uplink reference signals. Note that the DMRSs may be referred to as "user terminal-specific reference signals (UE-specific reference signals)." Also, the reference signals to be communicated are by no means limited to these.

(Radio Base Station)

Figure 12:
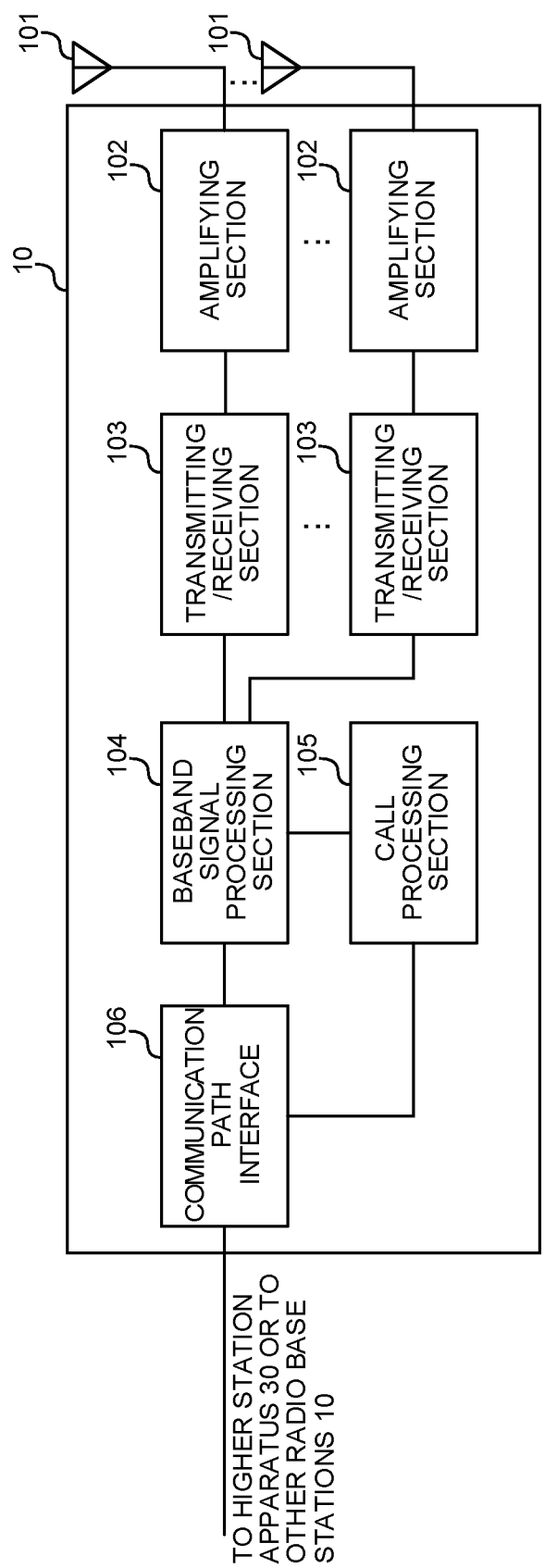
FIG. 12 is a diagram to show an example of an overall structure of radio base station according to one embodiment of the present invention.

FIG. 12 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105, and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to the transmitting/receiving sections 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 transmit synchronization signals, which are arranged in a first frequency domain, and a broadcast channel, which is arranged in a second frequency domain that is wider than the first frequency domain. Also, in at least part of predetermined frequency domain that neighbors the first frequency domain, the transmitting/receiving sections 103 do not transmit DL signals/DL channels, or transmit a specific DL signal/DL channel.

Figure 13:
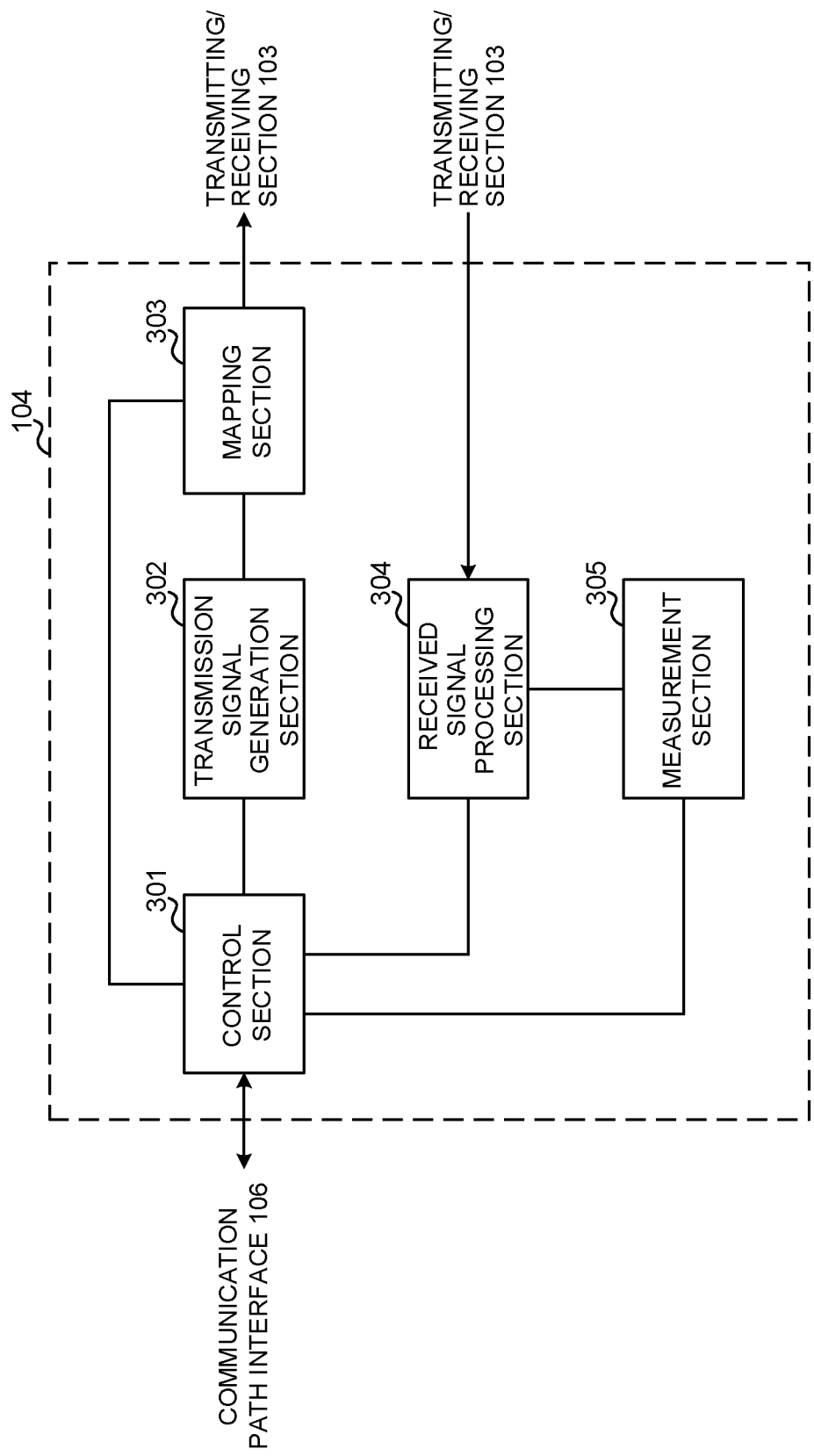
FIG. 13 is a diagram to show an example of a functional structure of radio base station according to one embodiment of the present invention.

FIG. 13 is a diagram to show an example of a functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104. The baseband signal processing section 104 has digital beam forming functions for providing digital beam forming.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, the generation of signals by the transmission signal generation section 302 (including signals that correspond to synchronization signals, MIB, the paging channel and the broadcast channel), the allocation of signals by the mapping section 303, and so on.

The control section 301 controls transmission of synchronization signals, which are arranged in a first frequency domain, and a broadcast channel, which is arranged in a second frequency domain that is wider than the first frequency domain, and the control section 301 exerts controls so that no DL signal/DL channel is mapped, or a specific DL signal/DL channel is mapped, in at least a part of given frequency domain that neighbors the first frequency domain.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. In an SS block, the mapping section 303 controls the mapping of DL signals in given frequency domain that neighbors NR-PSS/SSS. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals and so on). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

When signals are received, the measurement section 305 may measure, for example, the received power (for example, RSRP (Reference Signal Received Power)), the received quality (for example, RSRQ (Reference Signal Received Quality)), SINR (Signal to Interference plus Noise Ratio) and/or the like), channel states and so on. The measurement results may be output to the control section 301.

(User Terminal)

Figure 14:
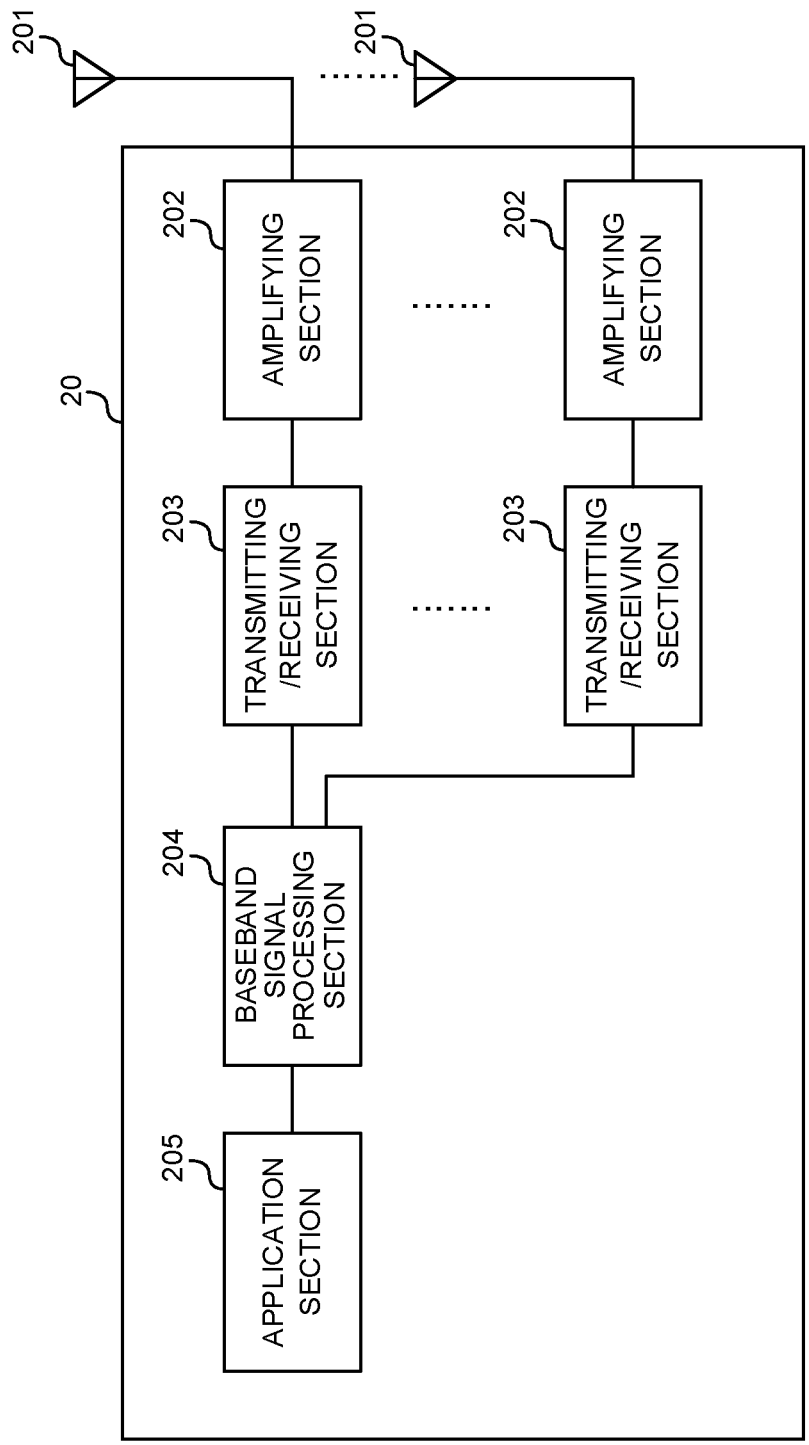
FIG. 14 is a diagram to show an example of an overall structure of a user terminal according to one embodiment of the present invention.

FIG. 14 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 may furthermore have an analog beam forming section that forms analog beams. The analog beam forming section may be constituted by an analog beam forming circuit (for example, a phase shifter, a phase shifting circuit, etc.) or analog beam forming apparatus (for example, a phase shifting device) that can be described based on general understanding of the technical field to which the present invention pertains. Furthermore, the transmitting/receiving antennas 201 may be constituted by, for example, array antennas.

The transmitting/receiving sections 203 receive synchronization signals, which are arranged in a first frequency domain, and a broadcast channel, which is arranged in a second frequency domain that is wider than the first frequency domain. Also, in at least part of given frequency domain that neighbors the first frequency domain, the transmitting/receiving sections 203 do not receive DL signals/DL channels, or receive a specific DL signal/DL channel.

Figure 15:
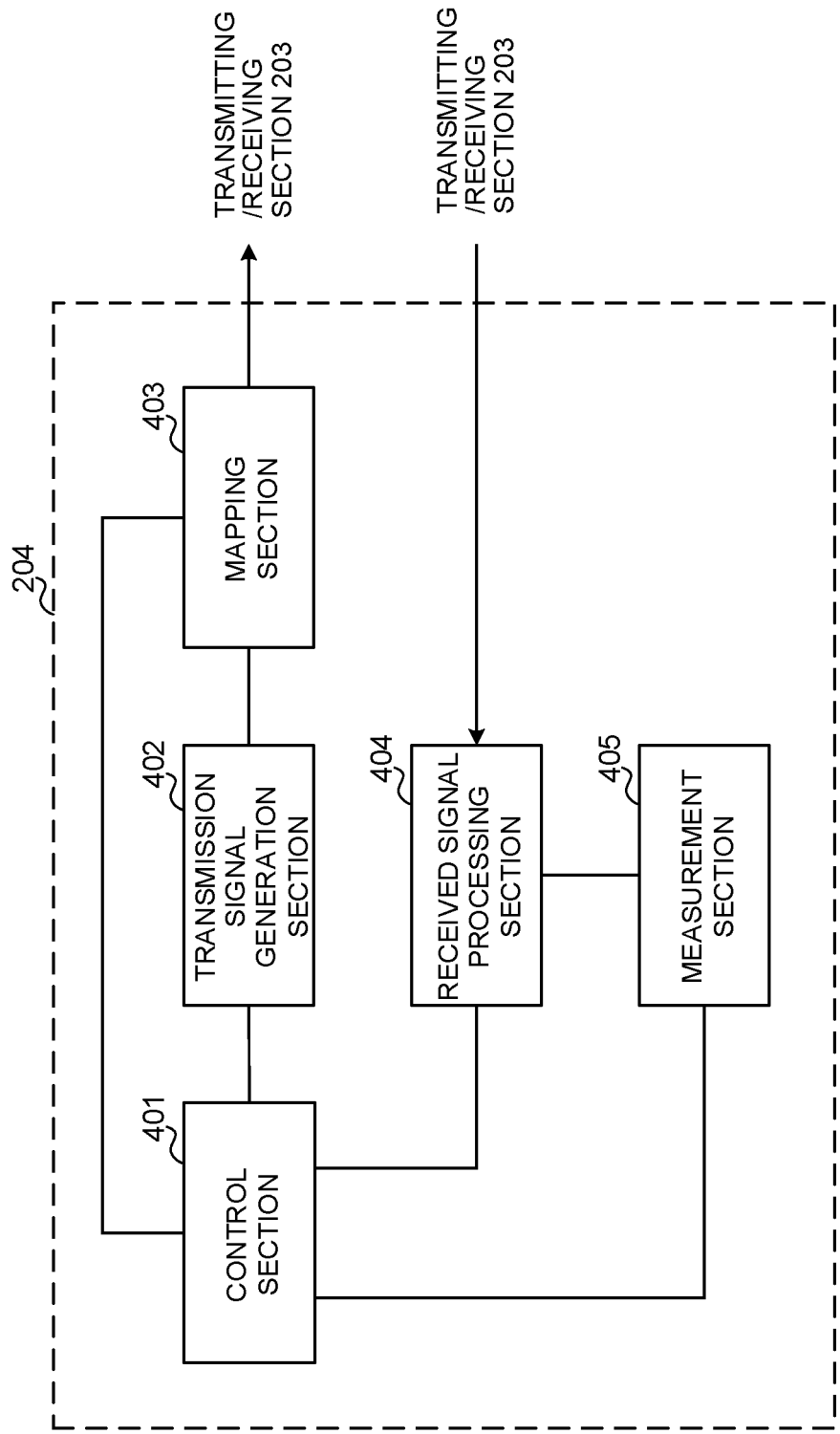
FIG. 15 is a diagram to show an example of a functional structure of a user terminal according to one embodiment of the present invention.

FIG. 15 is a diagram to show an example of a functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401 controls, for example, the generation of signals by the transmission signal generation section 402, and the allocation of signals by the mapping section 403, and so on. Furthermore, the control section 401 controls the signal receiving processes in the received signal processing section 404, and the measurements of signals in the measurement section 405.

The control section 401 controls receiving processes on the assumption that no DL signal is mapped in at least part of given frequency domain that neighbors the first frequency domain where synchronization signals are arranged, or on the assumption that a specific DL signal is mapped. Also, the control section 401 determines whether or not DL signals are mapped in the given frequency domain based on information that is reported from the radio base station.

Also, the control section 401 may exert control so that synchronization signals that are different from the synchronization signals arranged in the first frequency domain are received in the given frequency domain. Also, the control section 401 may exert control so that, in given frequency domain, at least one of the reference signal for use for demodulating the broadcast channel, the reference signal for radio resource and/or channel state measurement, and the reference signal for phase tracking is received. Also, the control section 401 may exert control so that, in a given frequency domain, a downlink control channel that uses a common search space, or a broadcast channel, is received.

The transmission signal generation section 402 generates uplink signals (uplink control signals, uplink data signals, uplink reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

Based on commands from the control section 401, the received signal processing section 404 receives synchronization signals and a broadcast channel, which the radio base station transmits by applying beam forming. In particular, the received signal processing section 404 receives the synchronization signals and the broadcast channel that are allocated to at least one of a plurality of time domain (for example, symbols) that constitute a predetermined transmission time interval (for example, subframe or slot).

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals, the signals after the receiving processes and so on, to the measurement section 405.

The measurement section 405 conducts measurements with respect to the received signals. For example, the measurement section 405 performs measurements using the beam forming RS transmitted from the radio base station 10. The measurement section 405 can be constituted by a measurer, a measurement circuit or measurement apparatus that can be described based on general understanding of the technical field to which the present invention pertains.

The measurement section 405 may measure, for example, the received power (for example, RSRP), the received quality (for example, RSRQ, received SINR), the channel states and so on of the received signals. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 16:
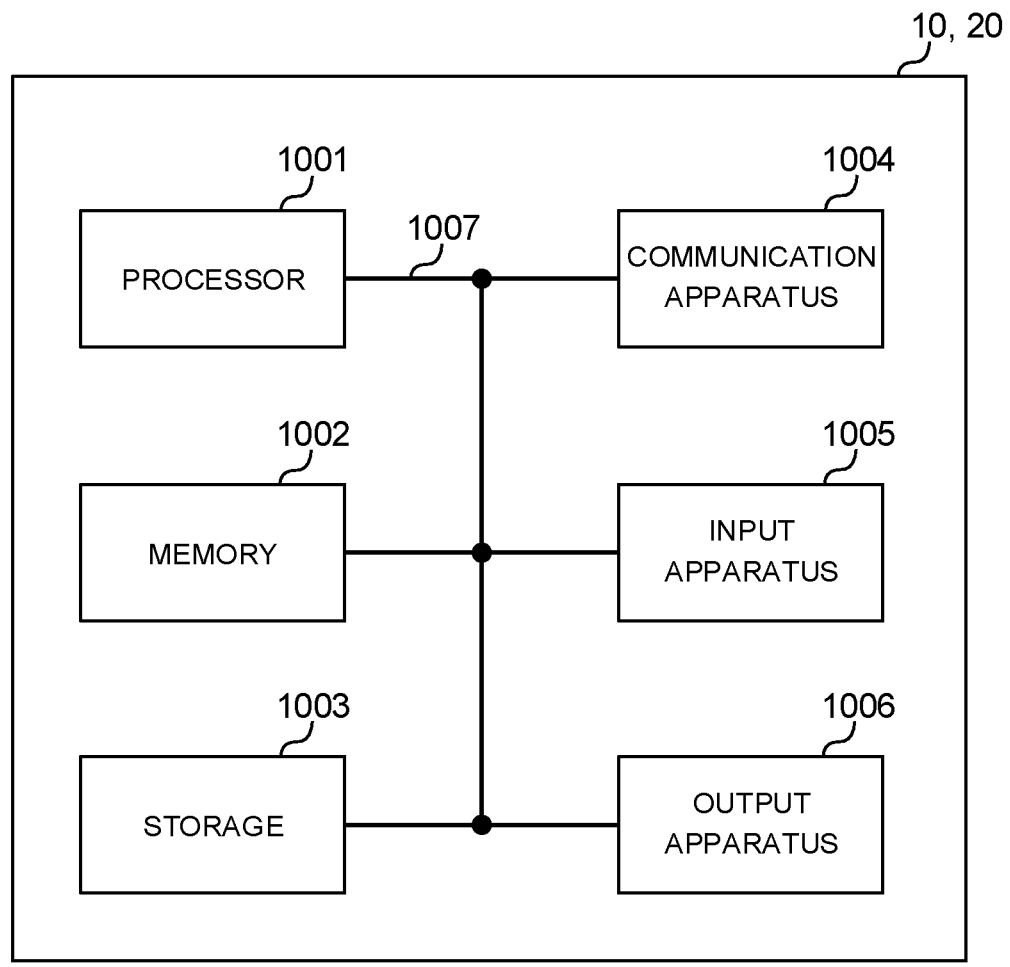
FIG. 16 is a diagram to show an example hardware structure of a radio base station and a user terminal according to one embodiment of the present invention.

For example, the radio base station, user terminals and so on according to embodiments of the present invention may function as a computer that executes the processes of the radio communication method of the present invention. FIG. 16 is a diagram to show an example hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. The hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented simultaneously or in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, each apparatus, including the processor 1001 and/or the memory 1002, is connected via a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit in signal communication. A radio frames, a subframe, a slot and a symbol may be each called by other applicable names. For example, one subframe may be referred to as a "transmission time interval (TTI)," or a plurality of consecutive subframes may be referred to as a "TTI," or one slot may be referred to as a "TTI." That is, a subframe and/or a TTI may be a subframe (1 ms) in existing LTE, may be a shorter period than 1 ms (for example, one to thirteen symbols), or may be a longer period of time than 1 ms.

Here, a TTI refers to the minimum time unit of scheduling in radio communication, for example. For example, in LTE systems, a radio base station schedules the allocation of radio resources (such as the frequency bandwidth and/or the transmission power that can be used by each user terminal) for each user terminal in TTI units. Note that the definition of TTIs is not limited to this. TTIs may be transmission time units for channel-encoded data packets (transport blocks), or may be the unit of processing in scheduling, link adaptation and so on.

A TTI having a time duration of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," a "shortened subframe," a "short subframe," or the like.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block (PRB (Physical RB))," a "PRB pair," an "RB pair," or the like.

Furthermore, a resource block may be comprised of one or more resource elements (REs). For example, one RE may be a radio resource field of one subcarrier and one symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) duration can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (for example, by not reporting this piece of information, by reporting another piece of information and so on).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, words such as "uplink" and/or "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
a receiver that receives a first synchronization signal (PSS), a second synchronization signal (SSS), and a broadcast channel (PBCH); and
a processor that controls, in a given block that is formed by a given number of symbols and a given number of subcarriers, reception of the PSS and the SSS which are located in a first frequency domain, and the PBCH which is located in at least a second frequency domain that is broader than the first frequency domain,
wherein, in the given block, a downlink signal is not located in a given resource that is contiguous with a resource of the PSS in the frequency direction, and
wherein the first frequency domain is included in a range of the second frequency domain, and a frequency domain of the given resource is an entire domain of the second frequency domain except for the first frequency domain.

2. The terminal according to claim 1, wherein the PSS, the SSS and the PBCH are at least located in different symbols.

3. The terminal according to claim 2, wherein a subcarrier corresponding to the given resource is predefined in accordance with predetermined specifications.

4. The terminal according to claim 2, wherein the processor controls reception by assuming that no other downlink signals are located in the given resource.

5. The terminal according to claim 1, wherein a subcarrier corresponding to the given resource is predefined in accordance with predetermined specifications.

6. The terminal according to claim 5, wherein the processor controls reception by assuming that no other downlink signals are located in the given resource.

7. The terminal according to claim 1, wherein the processor controls reception by assuming that no other downlink signals are located in the given resource.

8. A terminal comprising:
a receiver that receives a first synchronization signal (PSS), a second synchronization signal (SSS), and a broadcast channel (PBCH); and
a processor that controls, in a given block that is formed by a given number of symbols and a given number of subcarriers, reception of the PSS and the SSS which are located in a first frequency domain, and the PBCH which is located in at least part of a second frequency domain that is broader than the first frequency domain,
wherein, in the given block, at least one of the PBCH and a reference signal is located in at least part of a given resource that is contiguous with a resource of the SSS in the frequency direction, and
wherein a location pattern for a reference signal that is located in at least part of the given resource is the same as a location pattern for a reference signal that is located in different symbols to those of the SSS.

9. The terminal according to claim 8, wherein the PBCH and the reference signal are located in the given resource away from the SSS by a given interval.

10. The terminal according to claim 9, wherein the first frequency domain is included in the second frequency domain, and a frequency domain of the given resource is an entire domain of the second frequency domain except for the first frequency domain.

11. The terminal according to claim 9, wherein a subcarrier corresponding to the PBCH and the reference signal located in the given resource is predefined in accordance with predetermined specifications.

12. The terminal according to claim 8, wherein the first frequency domain is included in the second frequency domain, and a frequency domain of the given resource is an entire domain of the second frequency domain except for the first frequency domain.

13. The terminal according to claim 8, wherein a subcarrier corresponding to the PBCH and the reference signal located in the given resource is predefined in accordance with predetermined specifications.

14. A base station comprising:
a transmitter that transmits a first synchronization signal (PSS), a second synchronization signal (SSS), and a broadcast channel (PBCH); and
a processor that controls, in a given block that is formed by a given number of symbols and a given number of subcarriers, transmission of the PSS and the SSS which are located in a first frequency domain, and the PBCH which is located in at least a second frequency domain that is broader than the first frequency domain, wherein, in the given block, a downlink signal is not located in a given resource that is contiguous with a resource of the PSS in the frequency direction, and wherein the first frequency domain is included in a range of the second frequency domain, and a frequency domain of the given resource is an entire domain of the second frequency domain except for the first frequency domain.

15. A radio communication method for a terminal, the method comprising:

receiving a first synchronization signal (PSS), a second synchronization signal (SSS), and a broadcast channel (PBCH); and controlling, in a given block that is formed by a given number of symbols and a given number of subcarriers, reception of the PSS and the SSS which are located in a first frequency domain, and the PBCH which is located in at least a second frequency domain that is broader than the first frequency domain, wherein, in the given block, a downlink signal is not located in a given resource that is contiguous with a resource of the PSS in the frequency direction, and wherein the first frequency domain is included in a range of the second frequency domain, and a frequency domain of the given resource is an entire domain of the second frequency domain except for the first frequency domain.

16. A system comprising a base station and a terminal, wherein:

the base station comprises:

a transmitter that transmits a first synchronization signal (PSS), a second synchronization signal (SSS), and a broadcast channel (PBCH), and the terminal comprises:

a receiver that receives the PSS, the SSS, and the PBCH; and a processor that controls, in a given block that is formed by a given number of symbols and a given number of subcarriers, reception of the PSS and the SSS which are located in a first frequency domain, and the PBCH which is located in at least a second frequency domain that is broader than the first frequency domain, wherein, in the given block, a downlink signal is not located in a given resource that is contiguous with a resource of the PSS in the frequency direction, and wherein the first frequency domain is included in a range of the second frequency domain, and a frequency domain of the given resource is an entire domain of the second frequency domain except for the first frequency domain.

* * * * *